United States Patent
Zhou et al.

(10) Patent No.: US 10,205,830 B2
(45) Date of Patent: Feb. 12, 2019

(54) ECHO CANCELLATION DATA SYNCHRONIZATION CONTROL METHOD, TERMINAL, AND STORAGE MEDIUM

(71) Applicant: Tencent Technology (Shenzhen) Company Limited, Shenzhen, Guangdong (CN)

(72) Inventors: Xiaoxing Zhou, Guangdong (CN); Yuanjiang Peng, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/651,757

(22) Filed: Jul. 17, 2017

(65) Prior Publication Data

US 2017/0318161 A1 Nov. 2, 2017

Related U.S. Application Data

(63) Continuation of application No. PCT/CN2016/078661, filed on Apr. 7, 2016.

(30) Foreign Application Priority Data

Apr. 23, 2015 (CN) .......................... 2015 1 0197994

(51) Int. Cl.
*H04M 9/08* (2006.01)
*H04W 88/02* (2009.01)

(52) U.S. Cl.
CPC .............. *H04M 9/082* (2013.01); *H04M 9/08* (2013.01); *H04W 88/02* (2013.01)

(58) Field of Classification Search
CPC ........ H04M 9/082; H04W 88/02; H04B 3/23; H04B 3/238; G10L 21/02; G10L 21/0208; G10L 2021/02082; G10L 21/0232
See application file for complete search history.

(56) References Cited

U.S. PATENT DOCUMENTS

| 4,582,963 A | * | 4/1986 | Danstrom | ................ | H04B 3/23 |
| | | | | | 379/406.08 |
| 6,778,671 B1 | * | 8/2004 | Graumann | ............... | H04B 3/23 |
| | | | | | 379/406.01 |
| 2014/0254813 A1 | | 9/2014 | Anderton et al. | | |

FOREIGN PATENT DOCUMENTS

| CN | 1741686 A | 3/2006 |
| CN | 101064530 A | 10/2007 |

(Continued)

OTHER PUBLICATIONS

International Search Report and Written Opinion dated Jul. 1, 2016 for International Application No. PCT/CN2016/078661, 15 pages.

(Continued)

*Primary Examiner* — Jianxun Yang
(74) *Attorney, Agent, or Firm* — Brinks Gilson & Lione

(57) ABSTRACT

An echo cancellation data synchronization control method is disclosed. The method includes: estimating a sound card delay value; initializing and accumulating a near-end audio buffer queue and a reference audio buffer queue until a difference obtained by subtracting a length of the near-end audio buffer queue from a length of the reference audio buffer queue is greater than or equal to an audio data length corresponding to the sound card delay value; extracting, in accordance with audio frames, audio data from the head of the reference audio buffer queue and the head of the near-end audio buffer queue for echo cancellation processing; obtaining a relative delay value generated by performing echo cancellation processing; and adjusting the sound card delay value according to the relative delay value.

7 Claims, 8 Drawing Sheets

(56) References Cited

FOREIGN PATENT DOCUMENTS

| | | |
|---|---|---|
| CN | 1741686 B | 10/2010 |
| CN | 102625006 A | 8/2012 |
| CN | 104822001 A | 8/2015 |

OTHER PUBLICATIONS

Office Action dated Oct. 17, 2017 for Chinese Application No. 201510197994.5, 7 pages.

* cited by examiner

ECHO CANCELLATION DATA SYNCHRONIZATION CONTROL METHOD, TERMINAL, AND STORAGE MEDIUM

RELATED APPLICATIONS

This application is a continuation of International Patent Application CN2016/078661, filed Apr. 7, 2016, which claims priority to Chinese Patent Application No. 201510197994.5, entitled "ECHO CANCELLATION DATA SYNCHRONIZATION CONTROL METHOD AND APPARATUS", filed with the Chinese Patent Office on Apr. 23, 2015, both of which are incorporated herein by reference in their entirety.

FIELD OF THE TECHNOLOGY

The present disclosure relates to the field of audio signal processing technologies, and in particular, to echo cancellation data synchronization.

BACKGROUND OF THE DISCLOSURE

Referring to FIG. 1, at present, voice of a person may be captured by using a microphone 102, and the voice is played by using a loudspeaker 106 after being processed by a computer sound card 104. Then, the played voice is transmitted and reflected in an environment, and is captured by the microphone. In this way, an echo is formed, which is also referred to as an aftersound. The echo affects the voice quality and makes it difficult for a listener to understand speech from a loudspeaker. This affects accurate expression of the speech, and it is necessary to take some measures to cancel the echo.

At present, echo cancellation may be implemented by using an acoustic echo cancellation (AEC) algorithm. A basic principle of the AEC algorithm is to subtract the echo from a captured near-end voice. Echo generation model may be complex. In a simplified model it may be roughly considered that the echo is equal to a played far-end voice. In this way, an echo cancellation process is to subtract the far-end voice from the near-end voice. Herein, the near-end voice refers to voice data captured from the microphone, and the far-end voice refers to voice data played by the loudspeaker.

At present, for a process of echo cancellation using the AEC algorithm, refer to FIG. 2. After voice data from the far-end is received, the voice data is placed in a receive buffer. Then the voice data is extracted from the receive buffer and is placed in a sound card play buffer for playing, and at the same time, the extracted voice data is also placed in a reference audio buffer. After being captured by the microphone together with input voice to be transmitted to the far-end, the voice data played by using the loudspeaker is placed in a sound card capture buffer, and then the voice data in the sound card capture buffer is sent to a near-end audio buffer. Audio frames are extracted from both the reference audio buffer and the near-end audio buffer by using a synchronization control module, and are sent to an echo cancellation module for echo cancellation processing using the AEC algorithm. Finally, echo-cancelled voice data is sent out to the far-end.

A function of the synchronization control module is to control the near-end voice in the near-end audio buffer to be aligned with the far-end voice in the reference audio buffer, so as to ensure that the echo cancellation algorithm achieves an optimal effect. The alignment herein does not require the near-end voice to be completely aligned with the far-end voice; instead, it requires that a delay is kept at a stable value, to avoid jitters and offsets.

It is assumed that a total delay of audio data from entry into the sound card play buffer to being captured and staying in the sound card capture buffer is a sound card delay value sndCardDelayMs, a queue length of the reference audio buffer is refBufLen, a queue length of the near-end audio buffer is nearBufLen, and a length of the audio frame is kFrameSize. If audio data buffered in the reference audio buffer and audio data buffered in the near-end audio buffer are completely synchronous, Formula (1) is true:

$$(\text{refBufLen}-\text{nearBufLen})/\text{kFrameSize} = \text{sndCardDelayMs}. \quad \text{Formula (1):}$$

Therefore, an objective of ensuring relative synchronization between the audio data buffered in the reference audio buffer and the audio data buffered in the near-end audio buffer is to make Formula (2) true:

$$(\text{refBufLen}-\text{nearBufLen})/\text{kFrameSize} = \text{kRatio}*\text{sndCardDelayMs}. \quad \text{Formula (2):}$$

where kRatio in Formula (2) is a coefficient greater than or equal to 1.

In Formula (2), refBufLen and nearBufLen are computable values in a running process of a computer. Formula (2) ensures that an audio frame contained in the reference audio buffer can be found for effectively cancelling echo in an audio frame from the new-end audio buffer being processed. Now, a problem is that for a particular device, the sound card delay value sndCardDelayMs is constant, but for different devices, sound card delay values sndCardDelayMs are generally different. Especially for a mobile terminal such as a mobile phone, the difference between devices is more obvious. At present, during echo cancellation processing, the sound card delay value sndCardDelayMs is set to a constant value, in, for example, audio software installed on different mobile terminals. For compatibility with different devices, the constant value chosen is generally less than an actual value of a sound card delay value sndCardDelayMs of a known device.

However, if the sound card delay value sndCardDelayMs uses a relatively small constant value, a length of the voice data in the reference audio buffer is kept at a relatively low level. For a device whose sound card severely jitters in time, data in the reference audio buffer may become empty, and the echo cannot be cancelled. For a device whose sound card delay value is relatively large, a processing range of the AEC echo cancellation algorithm may be exceeded, and as a result the echo may not be effectively cancelled. If the sound card delay value sndCardDelayMs uses a relatively large constant value, for a device whose sound card delay value is relatively small, it is possible that the used constant value is greater than a delay of the sound card. This may result in a negative delay, and consequently, the echo also cannot be effectively cancelled. Therefore, echo cancellation performed by setting the sound card delay value to a constant value has poor compatibility and effectiveness, and echo cancellation may fail easily.

SUMMARY

An echo cancellation data synchronization control method, a terminal, and a storage medium are provided according to embodiments of this application.

An echo cancellation data synchronization control method is provided, including:

estimating a sound card delay value;

waiting until a difference obtained by subtracting a length of a near-end audio buffer queue from a length of a reference audio buffer queue is greater than or equal to an audio data length corresponding to the sound card delay value;

extracting, in accordance with audio frames, audio data from the reference audio buffer queue and the head of the near-end audio buffer queue for echo cancellation processing;

obtaining a relative delay value generated by performing echo cancellation processing; and adjusting the sound card delay value according to the relative delay value.

A terminal is provided, including a memory and a processor, and the memory storing an instruction, which, when executed by the processor, may enable the processor to perform the following steps:

estimating a sound card delay value;

waiting until a difference obtained by subtracting a length of a near-end audio buffer queue from a length of a reference audio buffer queue is greater than or equal to an audio data length corresponding to the sound card delay value;

extracting, in accordance with audio frames, audio data from the reference audio buffer queue and the head of the near-end audio buffer queue for echo cancellation processing;

obtaining a relative delay value generated by performing echo cancellation processing; and adjusting the sound card delay value according to the relative delay value.

One or more non-volatile computer readable storage media storing a computer executable instruction are provided, and when executed by the one or more processors, the computer executable instruction may enable the one or more processors to perform the following steps:

estimating a sound card delay value;

waiting until a difference obtained by subtracting a length of a near-end audio buffer queue from a length of a reference audio buffer queue is greater than or equal to an audio data length corresponding to the sound card delay value;

extracting, in accordance with audio frames, audio data from the reference audio buffer queue and the head of the near-end audio buffer queue for echo cancellation processing;

obtaining a relative delay value generated by performing echo cancellation processing; and adjusting the sound card delay value according to the relative delay value.

BRIEF DESCRIPTION OF THE DRAWINGS

To describe the technical solutions in the embodiments of the present invention or in the prior art more clearly, the following briefly introduces the accompanying drawings for describing the embodiments and implementations. The accompanying drawings in the following description show merely some example implementation of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present invention in detail with reference to the accompanying drawings and embodiments. It should be understood that specific embodiments and implementations described herein are merely used to explain the present disclosure but are not intended to limit the present disclosure.

Figure 3:
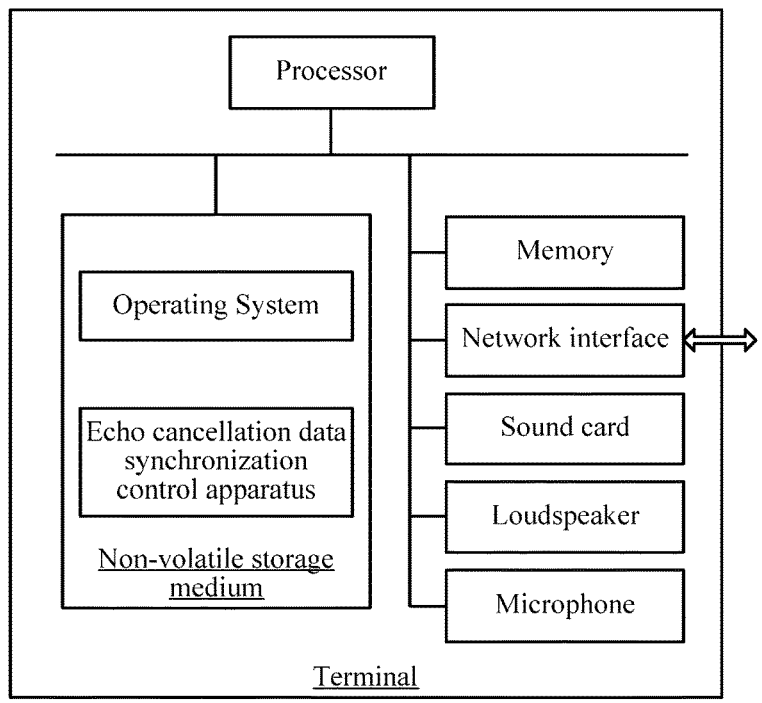
FIG. 3 is a schematic structural diagram of a terminal.

As shown in FIG. 3, in an embodiment, a terminal is provided. The terminal includes: a processor, a memory, a non-volatile storage medium, a network interface, a sound card, a microphone, and a loudspeaker that are connected to each other by using a system bus. The non-volatile storage medium of the terminal stores an operating system and echo cancellation data synchronization control instructions. The echo cancellation data synchronization control instructions, when executed by the processor, is configured to implement an echo cancellation data synchronization control method. The processor of the terminal is configured to execute the operating system and the instructions for the echo cancellation data synchronization control method. The sound card of the terminal is configured to provide an audio processing capability, and the sound card may be an independent sound card or an integrated sound card. The terminal may be a desktop computer or a mobile terminal, and the mobile terminal includes, but is not limited to, a mobile phone, a tablet computer, and a personal digital assistant (PDA).

Figure 1:
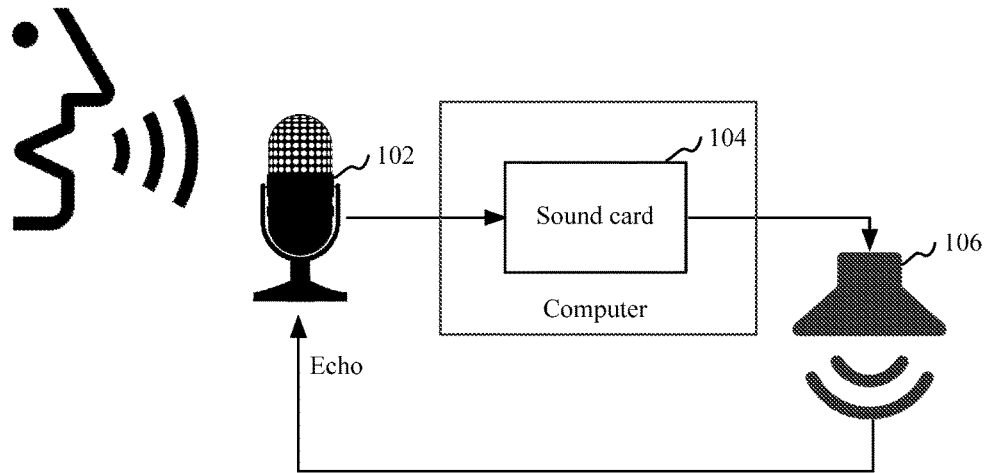
FIG. 1 is a schematic diagram showing a principle of generating an echo.
Figure 2:
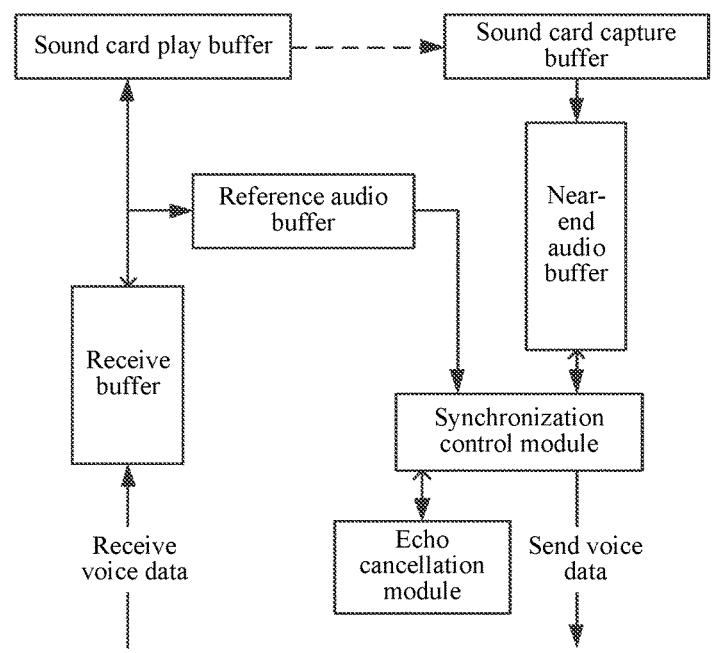
FIG. 2 is a schematic diagram of a process of echo cancellation data synchronization control.
Figure 4:
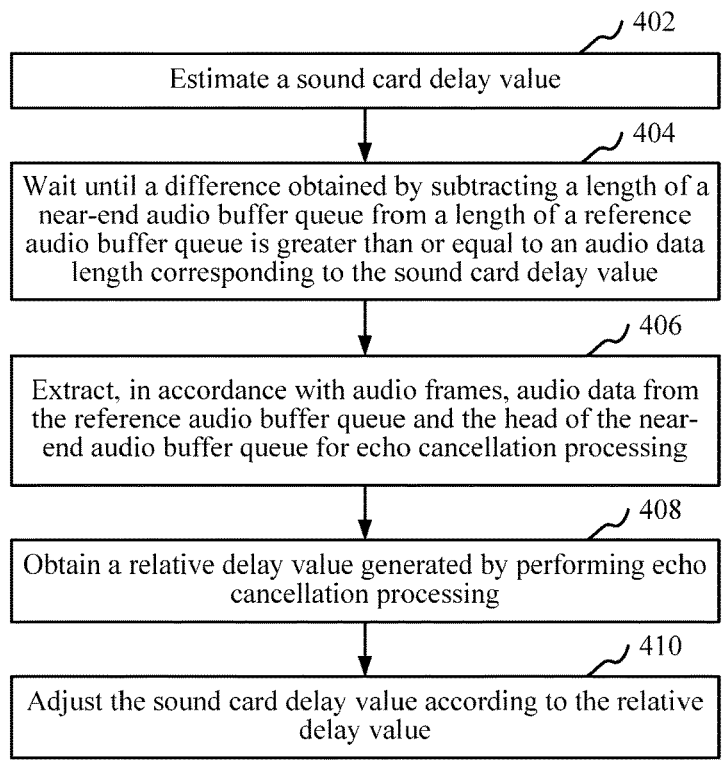
FIG. 4 is a logic flow of an echo cancellation data synchronization control method.

As shown in FIG. 4, in an embodiment, an echo cancellation data synchronization control method is provided. In this embodiment, an example in which the method is applied to the terminal in FIG. 3 is used for description. An implementation context of the method is shown in FIG. 2. The terminal is provided with a receive buffer, a sound card play buffer, a reference audio buffer, a sound card capture buffer, and a near-end audio buffer. Each buffer is implemented by using a first in first out queue. The terminal receives voice data from a network or another device, first places the voice data in the receive buffer, then extracts the voice data from the receive buffer and places the voice data in the sound card play buffer for playing, and at the same time, places the extracted voice data in the reference audio buffer. After the voice data played by the terminal by using the loudspeaker is captured by the microphone of the terminal together with input sound to be transmitted to the network or the other device, the voice data is placed in the sound card capture buffer, and then the terminal sends the voice data in the sound card capture buffer to the near-end audio buffer. A synchronization control module is configured to implement the echo cancellation data synchronization control method. Echo cancellation processing is performed by using an AEC-algorithm-based echo cancellation module. Finally, voice data obtained after the echo cancellation processing is output to the network or the another device. The method specifically includes the following steps:

Step 402: Estimate a sound card delay value.

Specifically, the sound card delay value refers to a total delay from entry into the sound card play buffer to the sound being produced by the loudspeaker, captured by the microphone, processed and stored in the sound card capture buffer. The sound card delay value intuitively represents the total delay caused by processing of audio by a sound card. Estimating the sound card delay value refers to a process in which an actual sound card delay value is estimated by means of conditional determination, calculation, or the like, to provide an estimated value that approximates the actual sound card delay value.

In one implementation, step 402 may specifically include: playing a test sound, and using a capture time point of the test sound minus a playing or rendering time point of the test sound as the estimated sound card delay value.

Specifically, on the premise that test sound is allowed to be played, a pre-recorded test sound may be played during startup, and a playing or rendering time point is recorded as rndTime, then a time point at which the test sound is captured by using the loudspeaker and microphone of the terminal is recorded as capTime, and the estimated sound card delay value sndCardDelayMs=capTime−rndTime. In this implementation, the sound card delay value may be relatively accurately estimated by playing and capturing the test sound.

In another alternative implementation, step 402 may specifically include: using a first call-back delay of an audio capture thread as the estimated sound card delay value.

Specifically, audio capture is usually used by means of call-back. That is, when a frame of audio data is captured, a function for executing program registration is called back, to notify that a frame of audio data is captured. In this way, the period of time from starting of the audio capture thread to call-back of the audio thread is a first call-back delay of the audio capture thread. It has been verified that if the call-back delay is stable and is greater than a preset threshold, the call-back delay is the same as a sound card capture delay, and therefore, can be used as the estimated sound card delay value. The preset threshold may range from 100 to 150 milliseconds (ms).

In one implementation, whether the first call-back delay is stable may be determined by determining whether a deviation of the first call-back delay is within a preset deviation range. A program is initialized for multiple execution. Therefore, multiple first call-back delays of multiple series of call-back delays are generated. Values of the first call-back delays may fluctuate. If all deviations between one first call-back delay and subsequent call-back delays are within the preset deviation range, this first call-back delay may be considered stable. The preset deviation range may be ±A %, and A may range from 5 to 15.

In another alternative implementation, step 402 may specifically include: using a preset constant delay value as the estimated sound card delay value. In this embodiment, statistics may be collected and performed on sound card delay values of a known fixed number of terminals. The preset constant delay value is determined according to a minimum value or an average value of the sound card delay values obtained through statistical analysis. A constant delay value may be less than the minimum value of the sound card delay values obtained through statistical analysis.

Step 404: Wait, while the a near-end audio buffer queue and a reference audio buffer queue is being accumulated for the condition that a difference obtained by subtracting a length of the near-end audio buffer queue from a length of the reference audio buffer queue is greater than or equal to an audio data length corresponding to the sound card delay value. As such, the near-end audio buffer queue and the reference audio buffer queue are accumulated with difference in buffered audio data that corresponds to the sound card delay value.

Specifically, it is assumed that the sound card delay value of the terminal is sndCardDelayMs, the length of the reference audio buffer queue is refBufLen, the length of the near-end audio buffer queue is nearBufLen, and the length of the audio frame is kFrameSize. In this case, Formula (1) is true:

$$(\text{refBufLen}-\text{nearBufLen})/k\text{FrameSize}=snd\text{CardDelay}Ms.$$

Audio data buffered in each buffer is a collection of audio samples. Audio processing is performed by using an audio frame as a unit. One audio frame includes a fixed number of multiple successive audio samples. The length of the audio frame kFrameSize is used for conversion between a time length and an audio data length. For example, an audio frame is usually 20 milliseconds (ms). If an audio sampling rate is 16000 Hz, the length of the audio frame is equal to 320 samples, that is, kFrameSize=20 ms*16 kHz=320.

Formula (1) is transformed into: refBufLen−nearBufLen=kFrameSize*sndCardDelayMs, which represents that the difference obtained by subtracting the length of the near-end audio buffer queue from the length of the reference audio buffer queue is equal to the audio data length corresponding to the sound card delay value. By waiting until a particular amount of audio data is accumulated in the reference audio buffer, it is ensured that echo cancellation can be successfully performed.

Step 406: Extract, in accordance with audio frames, audio data from the reference audio buffer queue and the head of the near-end audio buffer queue for echo cancellation processing.

Specifically, the audio data in the reference audio buffer and the audio data in the near-end audio buffer are collection of audio samples. Extracting an audio frame means extracting samples of a length for one audio frame. The audio frames extracted from the reference audio buffer queue and the near-end audio buffer queue respectively are sent to the AEC-algorithm-based echo cancellation module for echo cancellation processing, and voice data obtained after echo cancellation processing is output.

Step 408: Obtain a relative delay value generated by performing echo cancellation processing.

Referring to Formula (2): (refBufLen−nearBufLen)/kFrameSize=kRatio*sndCardDelayMs, herein, the relative delay value is defined as (kRatio−1)*sndCardDelayMs, which represents a deviated time difference as compared with completely synchronous audio data buffered in the reference audio buffer and audio data buffered in the near-end audio buffer. The relative delay value generated by performing echo cancellation processing reflects actually achieved relative delay value, which is referred simply as delay. This delay may be used as a feedback to the echo cancelation process.

Step 410: Adjust the sound card delay value according to the relative delay value.

Specifically, the sound card delay value may be calculated according to Formula (3):

$$sndCardDelayMs=(refBufLen-nearBufLen)/kFrameSize+delay. \quad \text{Formula (3):}$$

In Formula (3), sndCardDelayMs represents the sound card delay value, refBufLen represents the length of the reference audio buffer queue, nearBufLen represents the length of the near-end audio buffer queue, kFrameSize represents the length of the audio frame, and delay represents the relative delay value generated and fed back by performing echo cancellation processing. Therefore, Formula (3) represents adjusting the sound card delay value to a time length, which corresponds to the length of the reference audio buffer queue minus the length of the near-end audio buffer queue, plus the relative delay value. In alternative embodiment, a preset value may be added to or may be subtracted from the right side of Formula (3), or the right side of Formula (3) may be multiplied by a preset coefficient, to further tune the sound card delay value sndCardDelayMs.

According to the echo cancellation data synchronization control method above, after a sound card delay value is estimated, when a reference audio buffer and a near-end audio buffer satisfy a condition for performing echo cancellation by using the estimated sound card delay value, echo cancellation processing is performed. Then, a relative delay value generated by performing the echo cancellation processing is fed back to adjust the estimated sound card delay value, so that the adjusted sound card delay value is used in subsequent echo cancellation processing. In this way, even if the estimated sound card delay value is not accurate, the estimated sound card delay value can be optimized by means of feedback and adjustment in an echo cancellation process. Therefore, an anti-jitter capability may be improved. In addition, effective echo cancellation can be implemented on various different terminals, thereby improving compatibility.

Figure 5:
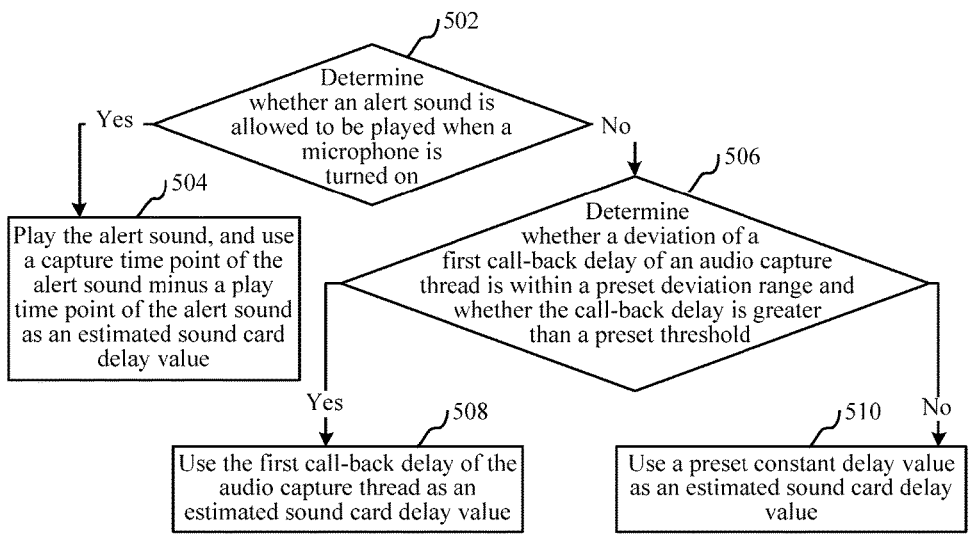
FIG. 5 is a schematic flowchart of a step of estimating a sound card delay value according to an embodiment.

As shown in FIG. 5, in one implementation, step 402 may specifically include:

Step 502: Determine whether a test sound is allowed to be played when a microphone is turned on; if yes, perform step 504; or if not, perform step 506.

Specifically, a preset configuration file may be read, to obtain a value of a flag bit representing whether the test sound is allowed to be played when the microphone is turned on. It may thus be determined, according to the value of flag bit, whether the test sound is allowed to be played when the microphone is turned on. Alternatively, options for allowing or not allowing playing the test sound when the microphone is turned on may be provided for user selection. It is then determined, according to a user selection instruction, whether the test sound is allowed to be played when the microphone is turned on.

Step 504: Play the test sound, and use a capture time point of the test sound minus a play time point of the test sound as the estimated sound card delay value.

Specifically, a pre-recorded test sound may be played during startup of a terminal device, and a play time point is recorded as rndTime. Then a time point at which the test sound is captured by using a loudspeaker and microphone of the terminal is recorded as capTime, and the estimated sound card delay value sndCardDelayMs=capTime−rndTime. In this embodiment, the sound card delay value may be relatively accurately estimated by playing and capturing the test sound.

Step 506: Determine whether a deviation of a first call-back delay of an audio capture thread is within a preset deviation range and whether the call-back delay is greater than a preset threshold; if yes, perform step 508; or if not, perform step 510.

Specifically, audio capture is usually used by means of call-back, that is, when a frame of audio data is captured, a function for executing program registration is called back, to notify that a frame of audio data is captured. In this way, a period of time from starting of the audio capture thread to call-back of the audio thread is a first call-back delay of the audio capture thread. It is verified that if the call-back delay is stable and is greater than a preset threshold, the call-back delay is the same as a sound card capture delay, and therefore, can be used as the estimated sound card delay value. The preset threshold may range from 100 to 150 ms.

In one implementation, whether the first call-back delay is stable may be determined by determining whether a deviation of the first call-back delay is within a preset deviation range. A program is initialized for multiple execution. Therefore, multiple first call-back delays of multiple series of call back delays are generated. Values of the first call-back delays may fluctuate. If deviations between one first call-back delay and subsequent call-back delays are all within the preset deviation range, this first call-back delay may be considered stable. The preset deviation range may be ±A %, and A may range from 5 to 15.

Step 508: Use the first call-back delay of the audio capture thread as the estimated sound card delay value.

Step 510: Use a preset constant delay value as the estimated sound card delay value.

Statistics may be collected and performed on sound card delay values of a known fixed number of terminals. The preset constant delay value is determined according to a minimum value or an average value of the sound card delay values obtained through statistical analysis. A constant delay value may be less than the minimum value of the sound card delay values obtained through statistical analysis.

In this implementation, a sound card delay value is estimated preferentially by using a test sound. when the option of test sound is not provided, the sound card delay value is estimated by using a first call-back delay of an audio capture thread. If estimation still cannot be performed, the sound card delay value is estimated finally by using a preset constant delay value. In this way, it is ensured, in multiple manners, that the sound card delay value can be estimated, and moreover, an estimation manner of relatively high accuracy is preferentially used, so that accuracy of the estimated sound card delay value can be improved as much as possible.

Figure 6:
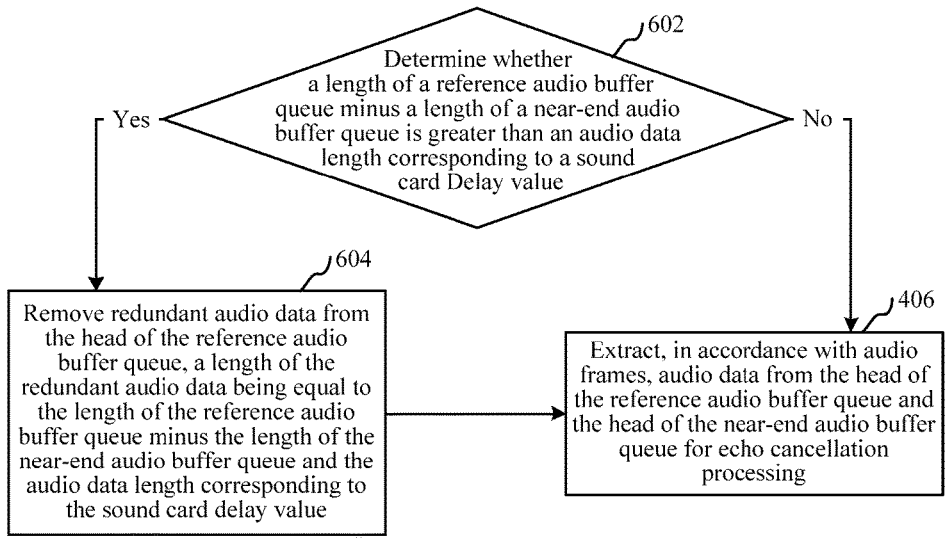
FIG. 6 is logic flow of dynamically adjusting a reference audio buffer queue.

As shown in FIG. 6, in one implementation, before step 406, a step of dynamically adjusting a reference audio buffer queue is further included, specifically including the following steps:

Step 602: Determine whether the length of the reference audio buffer queue minus the length of the near-end audio buffer queue is greater than the audio data length corresponding to the sound card delay value; if yes, perform step 406 after step 604 is performed; if not, perform step 406.

Step 602 is used for determining whether audio data buffered in the reference audio buffer and audio data buffered in the near-end audio buffer meet a causal relationship. If the determining result of step 602 is yes, there is no causal relationship, and the reference audio buffer queue needs to be adjusted; if the determining result of step 602 is no, there is a causal relationship, and the reference audio buffer queue does not need to be adjusted.

The causal relationship refers to that for audio data buffered in the near-end audio buffer, corresponding audio data can be found in the reference audio buffer for echo cancellation processing. Non-causal relationship refers to that for audio data buffered in the near-end audio buffer, no corresponding audio data can be found in the reference audio buffer for echo cancellation processing.

A determining condition of step 602 is expressed as Formula (4):

refBufLen−nearBufLen>kFrameSize*sndCardDelayMs.

In Formula (4), sndCardDelayMs represents the sound card delay value, refBufLen represents the length of the reference audio buffer queue, nearBufLen represents the length of the near-end audio buffer queue, and kFrameSize represents the length of the audio frame. Thus when Formula (4) is satisfied, there is non-causal relationship (or no corresponding audio data can be found in the reference audio buffer for echo cancellation processing).

Step 604: Remove unneeded audio data from the head of the reference audio buffer queue, a length of the unneeded audio data being equal to the length of the reference audio buffer queue minus the length of the near-end audio buffer queue and the audio data length corresponding to the sound card delay value.

Specifically, the length of the unneeded audio data is expressed as Formula (5):

refBufLen−(nearBufLen+kFrameSize*sndCardDelayMs).

In Formula (5), sndCardDelayMs represents the sound card delay value, refBufLen represents the length of the reference audio buffer queue, nearBufLen represents the length of the near-end audio buffer queue, and kFrameSize represents the length of the audio frame. (nearBufLen+kFrameSize*sndCardDelayMs) represents a sum of the length of the near-end audio buffer queue and the audio data length corresponding to the sound card delay value, and Formula (5) represents audio data, in the reference audio buffer queue, exceeding a length of the calculated sum.

In this embodiment, whether the length of the reference audio buffer queue minus the length of the near-end audio buffer queue is greater than the audio data length corresponding to the sound card delay value is continuously determined, so that when the causal relationship is not satisfied, the reference audio buffer queue is adjusted in time, thereby avoiding a case in which echo cancellation processing cannot be performed, and ensuring successful echo cancellation.

In one implementation, the echo cancellation data synchronization control method further includes: obtaining an echo return loss enhancement generated by performing echo cancellation processing; and performing step 410 of FIG. 4 when the relative delay value satisfies a preset stability condition and the echo return loss enhancement exceeds a preset enhancement threshold.

Specifically, an echo return loss enhancement (ERLE) may be generated by using an AEC algorithm. The echo return loss enhancement represents a degree of echo cancellation, e.g., a degree of attenuation of an echo after processing by an echo cancellation algorithm, and can be used for determining effectiveness of the relative delay value, delay. The preset enhancement threshold may range from 15 to 30 decibels. The preset stability condition refers to that the relative delay value is stable within a preset range. When the relative delay value is considered stable, it may still change within a preset range but does not significantly change. For example, the range that the relative delay value is considered stable may be a range of ±(5 to 15)%.

In this implementation, the effectiveness of the relative delay value delay in cancelling echo is determined by using the relative delay value delay to perform echo cancelation and then the echo return loss enhancement ERLE to evaluate the effectiveness of the cancellation, so as to ensure that echo cancellation processing can be successfully performed.

Figure 7:
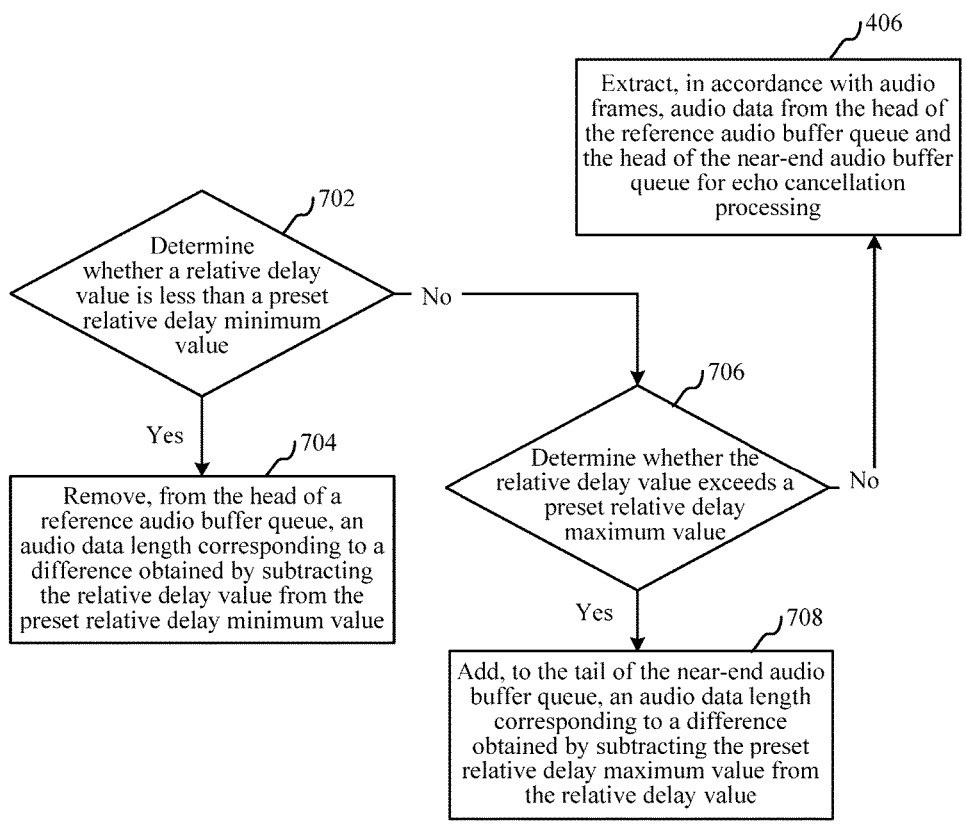
FIG. 7 is a logic flow of adjusting a relative delay value.

For example, as shown in FIG. 7, the echo cancellation data synchronization control method may further include a step of adjusting the relative delay value. The following steps may be specifically included:

Step 702: Determine whether the relative delay value is less than a preset relative delay minimum value; if yes, perform step 704; or if not, perform step 706.

For example, the relative delay value has a preset relative delay minimum value delayMin, where delayMin may range from 0 to 5 ms and may be preset as required.

Step 704: Remove, from the head of the reference audio buffer queue, an audio data length corresponding to a difference obtained by subtracting the relative delay value from the preset relative delay minimum value.

Specifically, when the relative delay value delay is close to or is less than the preset relative delay minimum value delayMin, it indicates that jitters may occur and there tends to be a non-causal relationship. Therefore, it may be necessary to adjust the reference audio buffer queue, so as to ensure a causal relationship by reducing the length of the reference audio buffer queue. For example, an audio data length of (delayMin−delay)*kFrameSize is removed from the head of the reference audio buffer queue.

Step 706: Determine whether the relative delay value exceeds a preset relative delay maximum value; if yes, perform step 708; or if not, return to step 406.

Specifically, the relative delay value has a preset relative delay maximum value delayMax, where, for example, delayMax may range from 50 to 150 ms and may be preset as required.

Step 708: Add, to the tail of the near-end audio buffer queue, an audio data length corresponding to a difference obtained by subtracting the preset relative delay maximum value from the relative delay value.

Specifically, when the relative delay value delay is close to or is greater than the preset relative delay maximum value delayMax, it indicates that jitters occur and the relative delay value delay tends to increase. Therefore, it may be necessary to adjust the reference audio buffer queue, to reduce the relative delay value delay by increasing the length of the reference audio buffer queue, so that the relative delay value delay is within a range of the echo cancellation algorithm.

In the implementation above, it is detected whether the relative delay value delay is within the range of [delayMin, delayMax]. If the relative delay value delay is not within the interval range, the length of the reference audio buffer queue is dynamically adjusted, to ensure that echo cancellation processing can be successfully performed.

Figure 8:
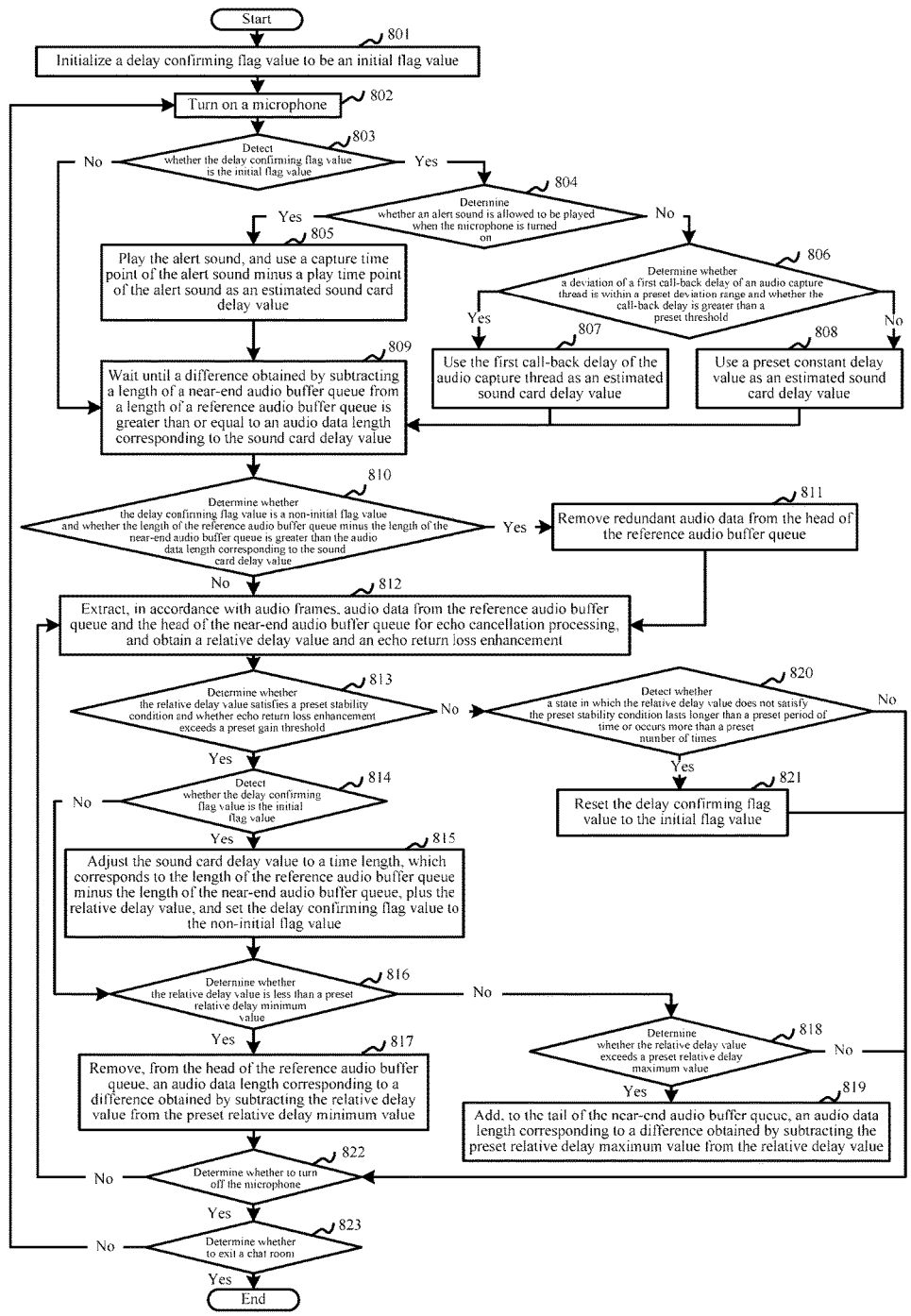
FIG. 8 is a logic flow of an echo cancellation data synchronization control method.

As shown in FIG. 8, in one example implementation, an echo cancellation data synchronization control method is provided, which is applied to echo cancellation in a voice chat room of, e.g., a social networking application. The method specifically includes the following steps:

Step 801: Initialize a delay confirming flag value to be an initial flag value. The delay confirming flag value is used for indicating whether there is a sound card delay value available currently. If the delay confirming flag value is the initial flag value, it indicates that there is no le sound card delay value available. If the delay confirming flag value is updated to a non-initial flag value, it indicates that there is a sound card delay value available, and a corresponding sound card delay value may be directly read. For example, the initial flag value may be 0, and the non-initial flag value may be 1.

Step 802: Turn on a microphone.

Step 803: Detect whether the delay confirming flag value is the initial flag value; if yes, perform step 804; or if not, perform step 809.

Specifically, herein, whether there is an available sound card delay value currently is determined by detecting whether the delay confirming flag value is the initial flag value. If there is a sound card delay value available, the sound card delay value available is read, and step 809 is performed. If there is no sound card delay value available yet, step 809 is performed after the sound card delay value is estimated via steps 804-808.

Step 804: Determine whether a test sound is allowed to be played when the microphone is turned on; if yes, perform step 805; or if not, perform step 806.

Step 805: Play the test sound, and use a capture time point of the test sound minus a play time point of the test sound as an estimated sound card delay value.

Step 806: Determine whether a deviation of a first call-back delay of an audio capture thread is within a preset deviation range and whether the call-back delay is greater than a preset threshold; if yes, perform step 809 after step 807 is performed; or if not, perform step 809 after step 808 is performed.

Step 807: Use the first call-back delay of the audio capture thread as the estimated sound card delay value.

Step 808: Use a preset constant delay value as the estimated sound card delay value.

Step 809: Wait while the a near-end audio buffer queue and a reference audio buffer queue is being accumulated until a difference obtained by subtracting a length of the near-end audio buffer queue from a length of the reference audio buffer queue is greater than or equal to an audio data length corresponding to the sound card delay value. As such, the near-end audio buffer queue and the reference audio buffer queue are accumulated with difference in buffered audio data that corresponds to the sound card delay value.

Step 810: Determine whether the delay confirming flag value is a non-initial flag value and whether the length of the reference audio buffer queue minus the length of the near-end audio buffer queue is greater than the audio data length corresponding to the sound card delay value; if yes, perform step 812 after step 811 is performed; if not, perform step 812.

Step 812: Extract, in accordance with audio frames, audio data from the reference audio buffer queue and the head of the near-end audio buffer queue for echo cancellation processing, and obtain a relative delay value and an echo return loss enhancement.

Step 813: Determine whether the relative delay value satisfies a preset stability condition and whether the echo return loss enhancement exceeds a preset enhancement threshold; if yes, perform step 814; or if not, perform step 820.

Specifically, the preset stability condition may be that a current relative delay value delay changes within a preset range compared with a previously obtained relative delay value delay, for example, changes within a range of ±(5 to 15)%.

Step 814: Detect whether the delay confirming flag value is the initial flag value; if yes, perform step 816 after step 815 is performed; or if not, perform step 816.

Step 815: Adjust the sound card delay value to a time length, which corresponds to the length of the reference audio buffer queue minus the length of the near-end audio buffer queue, plus the relative delay value, and set the delay confirming flag value to the non-initial flag value.

Specifically, after the sound card delay value is adjusted, the sound card delay value is updated. There is a sound card delay value available. The delay confirming flag value needs to be set to the non-initial flag value, for example, set to 1. In this way, echo cancellation processing may be subsequently performed by using the sound card delay value.

Step 816: Determine whether the relative delay value is less than a preset relative delay minimum value; if yes, perform step 822 after step 817 is performed; or if not, perform step 818.

Step 817: Remove, from the head of the reference audio buffer queue, an audio data length corresponding to a difference obtained by subtracting the relative delay value from the preset relative delay minimum value.

Step 818: Determine whether the relative delay value exceeds a preset relative delay maximum value; if yes, perform step 819; or if not, perform step 822.

Step 819: Add, to the tail of the near-end audio buffer queue, an audio data length corresponding to a difference obtained by subtracting the preset relative delay maximum value from the relative delay value.

Step 820: Detect whether a state in which the relative delay value does not satisfy the preset stability condition lasts longer than a preset period of time or occurs more than a preset number of times; if yes, perform step 822 after step 821 is performed; or if not, perform step 822.

Specifically, the preset period of time may be 500 to 3000 ms, and the preset number of times, for example, may be 3 to 10 times.

Step 821: Reset the delay confirming flag value to the initial flag value.

The situation in which the relative delay value does not satisfy the preset stability condition lasts longer than the preset period of time or occurs more than the preset number of times may indicate that the current sound card delay value may have a problem. The delay confirming flag value needs to be reset to the initial flag value. The sound card delay value is subsequently re-updated.

Step 822: Determine whether to turn off the microphone; if yes, perform step 823; if not, perform step 812.

In one alternative implementation, step 823 or step 812 may be directly performed without performing step 822.

Step 823: Determine whether to exit a chat room; if yes, end the process; or if not, perform step 802.

According to the example echo cancellation data synchronization control method applied to a voice chat room application above, after a sound card delay value is estimated, when a reference audio buffer and a near-end audio buffer satisfy a condition for performing echo cancellation by using the estimated sound card delay value, echo cancellation processing is performed. Then, a relative delay value generated by performing the echo cancellation processing is fed back to adjust the estimated sound card delay value, so that the adjusted sound card delay value is used in subsequent echo cancellation processing. In this way, even if the estimated sound card delay value is not accurate, the estimated sound card delay value can be optimized by means of feedback and adjustment in an echo cancellation process. Therefore, an anti-jitter capability for echo cancellation may be improved. In addition, effective echo cancellation can be implemented on various different terminals involved in chats, thereby improving compatibility.

Figure 9:
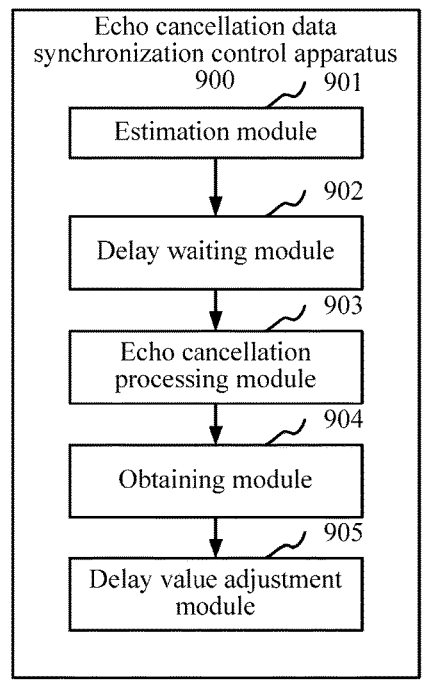
FIG. 9 is a structural block diagram of an echo cancellation data synchronization control apparatus.

As shown in FIG. 9, an example implementation of an echo cancellation data synchronization control apparatus 900 is provided for implementing the echo cancellation data synchronization control method above. The echo cancellation data synchronization control apparatus 900 includes: an estimation module 901, a delay waiting module 902, an echo cancellation processing module 903, an obtaining module 904, and a delay value adjustment module 905.

The estimation module 901 is configured to estimate a sound card delay value.

The delay waiting module 902 is configured to wait while the a near-end audio buffer queue and a reference audio buffer queue is being accumulated until a difference obtained by subtracting a length of the near-end audio buffer queue from a length of the reference audio buffer queue is greater than or equal to an audio data length corresponding to the sound card delay value. As such, the near-end audio buffer queue and the reference audio buffer queue are accumulated with difference in buffered audio data that corresponds to the sound card delay value.

The echo cancellation processing module 903 is configured to extract, in accordance with audio frames, audio data from the reference audio buffer queue and the head of the near-end audio buffer queue for echo cancellation processing.

The obtaining module 904 is configured to obtain a relative delay value generated by performing echo cancellation processing.

The delay value adjustment module 905 is configured to adjust the sound card delay value according to the relative delay value.

In one implementation, the estimation module 901 is further configured to: play a test sound, and use a capture time point of the test sound minus a play time point of the test sound as the estimated sound card delay value.

In an alternative implementation, the estimation module 901 is further configured to use a first call-back delay of an audio capture thread as the estimated sound card delay value.

In another alternative implementation, the estimation module 901 is further configured to use a preset constant delay value as the estimated sound card delay value.

Figure 10:
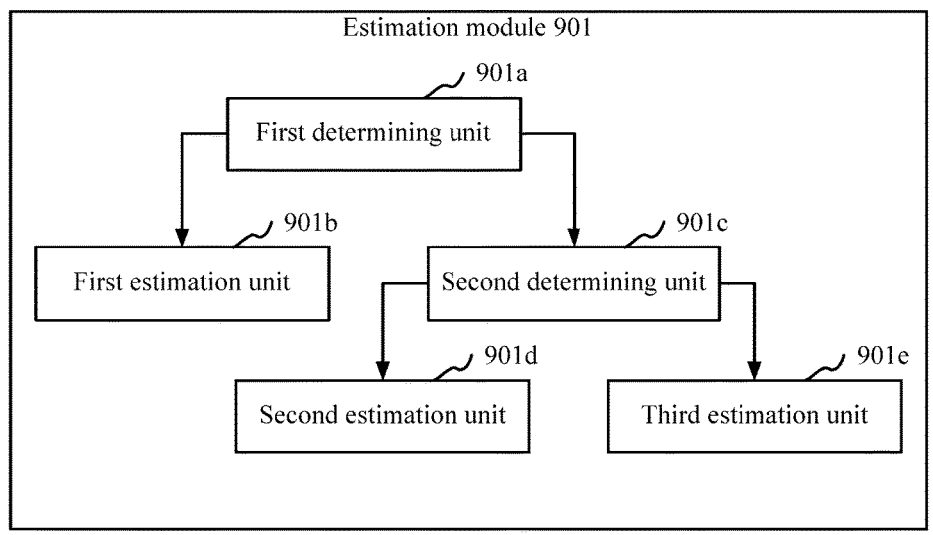
FIG. 10 is a structural block diagram of the estimation module in FIG. 9.

As shown in FIG. 10, an example implementation for the estimation module 901 may include: a first determining unit 901*a*, a first estimation unit 901*b*, a second determining unit 901*c*, a second estimation unit 901*d*, and a third estimation unit 901*e*.

The first determining unit 901*a* is configured to determine whether a test sound is allowed to be played when a microphone is turned on.

The first estimation unit 901*b* is configured to: if it is determined that the test sound is allowed to be played when the microphone is turned on, use a capture time point of the test sound minus a play time point of the test sound as the estimated sound card delay value.

The second determining unit 901*c* is configured to: if it is determined that the test sound is not allowed to be played when the microphone is turned on, determine whether a deviation of a first call-back delay of an audio capture thread is within a preset deviation range and whether the call-back delay is greater than a preset threshold.

The second estimation unit 901*d* is configured to: if the deviation of the first call-back delay of the audio capture thread is within the preset deviation range and the call-back delay is greater than the preset threshold, use the first call-back delay of the audio capture thread as the estimated sound card delay value.

The third estimation unit 901*e* is configured to: if the deviation of the first call-back delay of the audio capture thread is not within the preset deviation range or the call-back delay is not greater than the preset threshold, use a preset constant delay value as the estimated sound card delay value.

Figure 11:
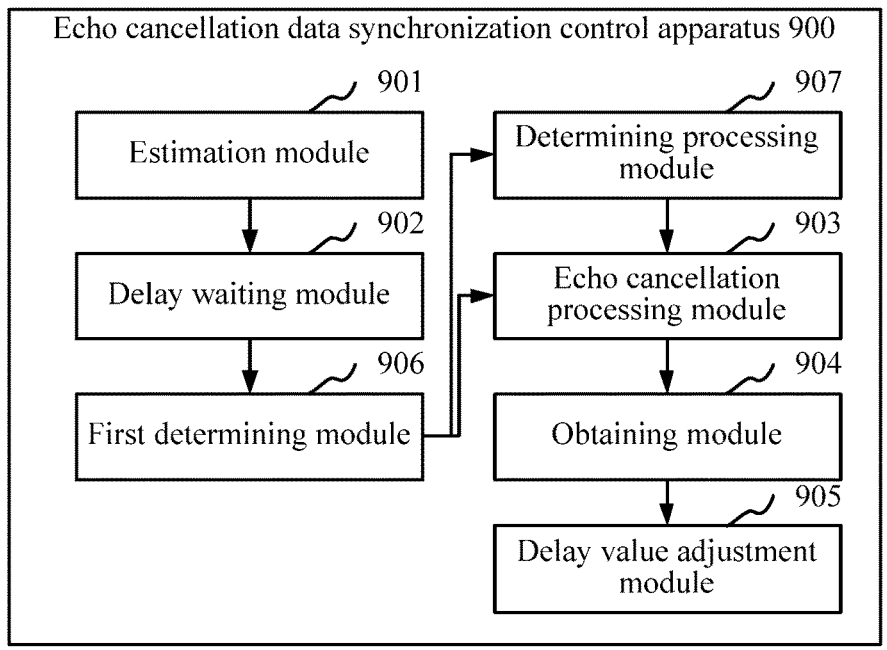
FIG. 11 is a another structural block diagram of an echo cancellation data synchronization control apparatus.

As shown in FIG. 11, an example implementation of the echo cancellation data synchronization control apparatus 900 further includes a first determining module 906 and a determining processing module 907.

The first determining module 906 is configured to determine whether the length of the reference audio buffer queue minus the length of the near-end audio buffer queue is greater than the audio data length corresponding to the sound card delay value.

The determining processing module 907 is configured to: if the length of the reference audio buffer queue minus the length of the near-end audio buffer queue is greater than the audio data length corresponding to the sound card delay value, remove unneeded audio data from the head of the reference audio buffer queue, a length of the unneeded audio data being equal to the length of the reference audio buffer queue minus the length of the near-end audio buffer queue and the audio data length corresponding to the sound card delay value.

The echo cancellation processing module 903 is further configured to: after the unneeded audio data is removed, or when the length of the reference audio buffer queue minus the length of the near-end audio buffer queue is not greater than the audio data length corresponding to the sound card delay value, extract, in accordance with the audio frames, the audio data from the reference audio buffer queue and the head of the near-end audio buffer queue for echo cancellation processing.

In one implementation, the obtaining module 904 is further configured to obtain an echo return loss enhancement generated by performing echo cancellation processing.

The delay value adjustment module 905 is further configured to: when the relative delay value satisfies a preset stability condition and the echo return loss enhancement exceeds a preset enhancement threshold, adjust the sound card delay value according to the relative delay value.

In one implementation, the delay value adjustment module 905 is further configured to adjust the sound card delay value to a time length, which corresponds to the length of the reference audio buffer queue minus the length of the near-end audio buffer queue, plus the relative delay value.

Figure 12:
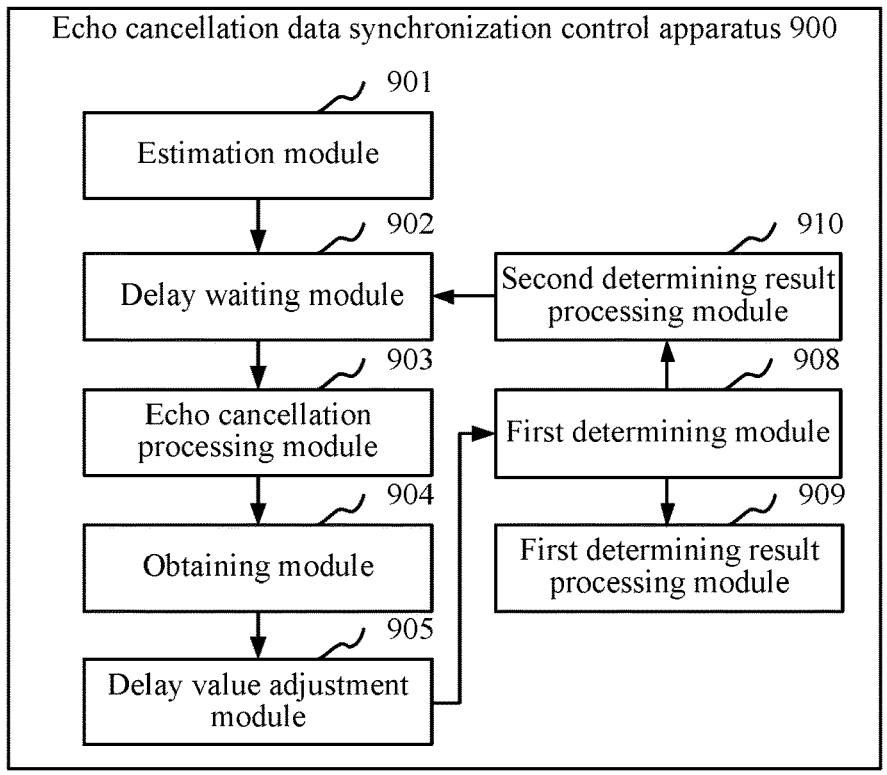
FIG. 12 is a structural block diagram of an echo cancellation data synchronization control apparatus.

As shown in FIG. 12, an example implementation of the echo cancellation data synchronization control apparatus 900 further includes:

a first determining module 908, configured to determine whether the relative delay value is less than a preset relative delay minimum value;

a first determining result processing module 909, configured to: if the relative delay value is less than the preset relative delay minimum value, remove, from the head of the reference audio buffer queue, an audio data length corresponding to a difference obtained by subtracting the relative delay value from the preset relative delay minimum value; and a second determining result processing module 910, configured to: if the relative delay value is greater than or equal to the preset relative delay minimum value, when it is determined that the relative delay value exceeds a preset relative delay maximum value, add, to the tail of the near-end audio buffer queue, an audio data length corresponding to a difference obtained by subtracting the preset relative delay maximum value from the relative delay value.

Figure 13:
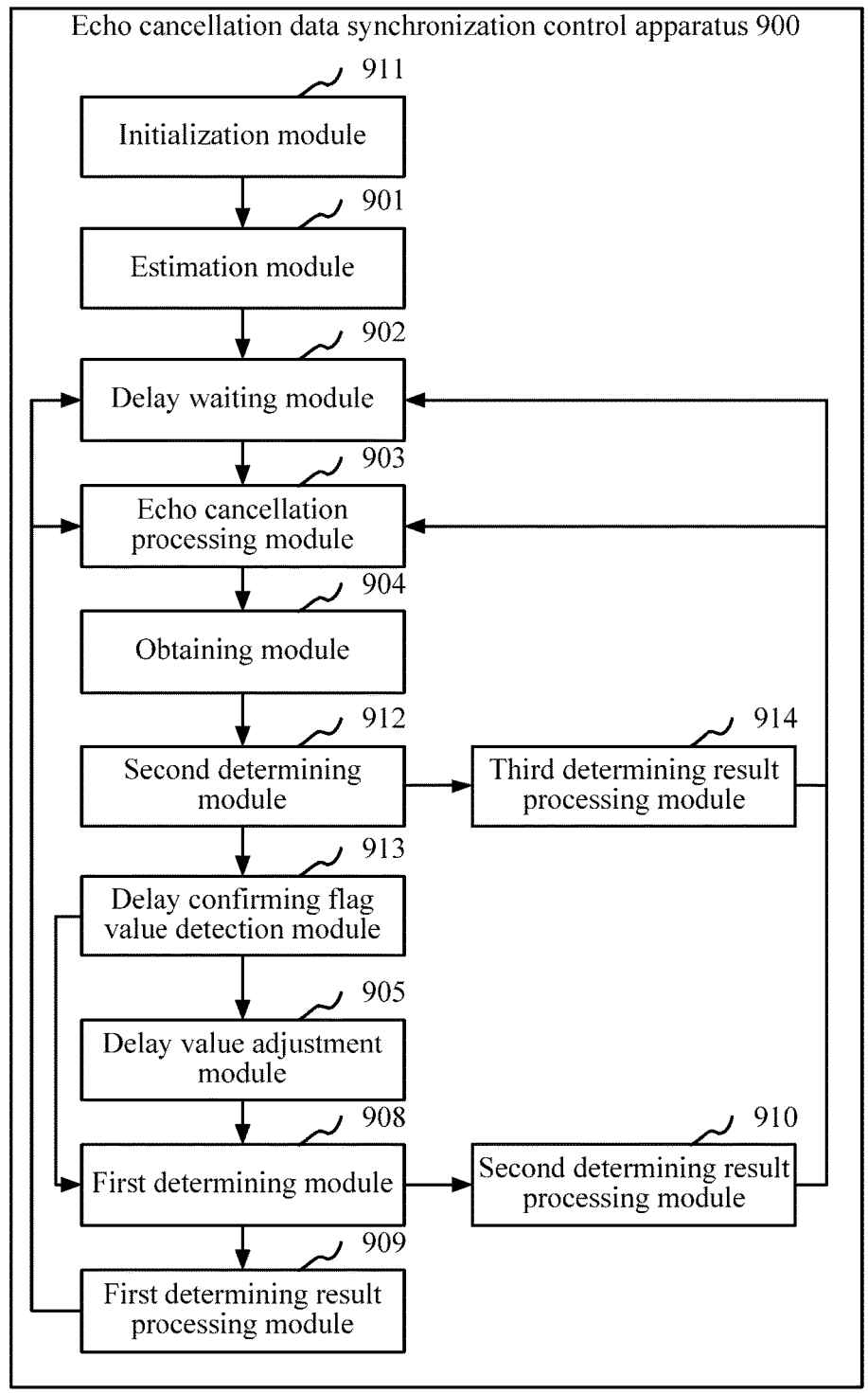
FIG. 13 is a structural block diagram of an echo cancellation data synchronization control apparatus.

As shown in FIG. 13, an example implementation of the echo cancellation data synchronization control apparatus 900 may further include: an initialization module 911, a second determining module 912, a delay confirming flag value detection module 913, and a third determining result processing module 914.

The initialization module 911 is configured to initialize a delay confirming flag value to be an initial flag value.

The obtaining module 904 is further configured to obtain an echo return loss enhancement generated by performing echo cancellation processing.

The second determining module 912 is configured to determine whether the relative delay value satisfies a preset stability condition and whether the echo return loss enhancement exceeds a preset enhancement threshold.

The delay confirming flag value detection module 913 is configured to: if the relative delay value satisfies the preset stability condition and the echo return loss enhancement exceeds the preset enhancement threshold, detect whether the delay confirming flag value is the initial flag value.

The delay value adjustment module 905 is further configured to: if the delay confirming flag value is the initial flag value, adjust the sound card delay value according to the relative delay value, and set the delay confirming flag value to a non-initial flag value.

The first determining module 908 is configured to: if the delay confirming flag value is not the initial flag value, determine whether the relative delay value is less than a preset relative delay minimum value.

The first determining result processing module 909 is configured to: if the relative delay value is less than the preset relative delay minimum value, remove, from the head of the reference audio buffer queue, an audio data length corresponding to a difference obtained by subtracting the relative delay value from the preset relative delay minimum value.

The second determining result processing module 910 is configured to: if the relative delay value is greater than or equal to the preset relative delay minimum value, when it is determined that the relative delay value exceeds a preset relative delay maximum value, add, to the tail of the near-end audio buffer queue, an audio data length corresponding to a difference obtained by subtracting the preset relative delay maximum value from the relative delay value.

The third determining result processing module 914 is configured to reset, if the relative delay value does not satisfy the preset stability condition or the echo return loss enhancement does not exceed the preset enhancement threshold, the delay confirming flag value to the initial flag value when it is detected that a state in which the relative delay value does not satisfy the preset stability condition lasts longer than a preset period of time or occurs more than a preset number of times.

According to the echo cancellation data synchronization control apparatus 900, after the sound card delay value is estimated, when the reference audio buffer and the near-end audio buffer satisfy a condition for performing echo cancellation by using the estimated sound card delay value, echo cancellation processing is performed. Then, the relative delay value generated by performing the echo cancellation processing is fed back to adjust the estimated sound card delay value, so that the adjusted sound card delay value is used in subsequent echo cancellation processing. In this way, even if the estimated sound card delay value is not accurate, the estimated sound card delay value can be optimized by means of feedback and adjustment in an echo cancellation process. Therefore, an anti-jitter capability of the echo cancellation process may be improved. In addition, effective echo cancellation can be implemented on various different terminals, thereby improving compatibility.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a non-volatile storage medium such as a magnetic disk, an optical disc, or a read-only memory (ROM), or a random access memory (RAM).

Technical features of the foregoing embodiments may be randomly combined. For brevity of description, not all possible combinations of the technical features in the foregoing implementations are described. However, it should be considered that the combinations of the technical features fall within the scope described in this specification.

The foregoing embodiments are merely examples of the present invention. However, the detailed descriptions above should not be construed as a limitation to the patent scope of the present disclosure. It should be noted that, a person of ordinary skill in the art may further make variations and improvements without departing from the concept of the present disclosure, and the variations and improvements are within the protection scope of the present disclosure.

What is claimed is:

1. An echo cancellation data synchronization control method for a computer sound card, the method implemented on a terminal including a memory and a processor, the memory storing instructions, which when executed by the processor, enable the processor to perform the method comprising:
    initializing a delay confirming flag value to be an initial flag value;
    estimating a sound card delay value of the computer sound card;
    initializing and accumulating a near-end audio buffer queue and a reference audio buffer queue until a difference obtained by subtracting a length of the near-end audio buffer queue from a length of the reference audio buffer queue is greater than or equal to an audio data length corresponding to the sound card delay value;
    extracting, in accordance with audio frames, audio data from the reference audio buffer queue and head of the near-end audio buffer queue for echo cancellation processing;
    obtaining a relative delay value generated by performing echo cancellation processing;
    obtaining an echo return loss enhancement generated by performing the echo cancellation processing;
    determining whether the relative delay value satisfies a preset stability condition and whether the echo return loss enhancement exceeds a preset enhancement threshold;
    adjusting the sound card delay value according to the relative delay value and thereafter setting the delay confirming flag value from an initial flag value to a non-initial flag value; and
    determining whether the relative delay value is less than a preset relative delay minimum value if the delay confirming flag value is not the initial flag value; if the relative delay value is less than the preset relative delay minimum value, removing, from the head of the reference audio buffer queue, an audio data length corresponding to a difference obtained by subtracting the relative delay value from the preset relative delay minimum value; or if the relative delay value is not less than the preset relative delay minimum value, adding, to tail of the near-end audio buffer queue, an audio data length corresponding to a difference obtained by subtracting a preset relative delay maximum value from the relative delay value, when it is determined that the relative delay value exceeds the preset relative delay maximum value.

2. The method according to claim 1, wherein before adjusting the sound card delay value according to the relative delay value, the method further comprises:
obtaining an echo return loss enhancement generated by performing echo cancellation processing; and
determining that the relative delay value satisfies a preset stability condition and the echo return loss enhancement exceeds a preset enhancement threshold.

3. The method according to claim 1, further comprising:
resetting, if the relative delay value does not satisfy the preset stability condition or the echo return loss enhancement does not exceed the preset enhancement threshold, the delay confirming flag value to the initial flag value when it is detected that a state in which the relative delay value does not satisfy the preset stability condition lasts longer than a preset period of time or occurs more than a preset number of times.

4. A terminal, comprising a memory storing instructions and a processor in communication with the memory, and when executing the instructions, the processor is configured to:
initialize a delay confirming flag value to be an initial flag value;
estimate a sound card delay value of a computer sound card;
initialize and accumulate a near-end audio buffer queue and a reference audio buffer queue until a difference obtained by subtracting a length of the near-end audio buffer queue from a length of the reference audio buffer queue is greater than or equal to an audio data length corresponding to the sound card delay value;
extract, in accordance with audio frames, audio data from the reference audio buffer queue and head of the near-end audio buffer queue for echo cancellation processing;
obtain a relative delay value generated by performing echo cancellation processing;
obtain an echo return loss enhancement generated by performing the echo cancellation processing;
determine whether the relative delay value satisfies a preset stability condition and whether the echo return loss enhancement exceeds a preset enhancement threshold;
adjust the sound card delay value according to the relative delay value and thereafter setting the delay confirming flag value from an initial flag value to a non-initial flag value; and
determine whether the relative delay value is less than a preset relative delay minimum value if the delay confirming flag value is not the initial flag value; if the relative delay value is less than the preset relative delay minimum value, remove, from the head of the reference audio buffer queue, an audio data length corresponding to a difference obtained by subtracting the relative delay value from the preset relative delay minimum value; or if the relative delay value is not less than the preset relative delay minimum value, add, to tail of the near-end audio buffer queue, an audio data length corresponding to a difference obtained by subtracting a preset relative delay maximum value from the relative delay value, when it is determined that the relative delay value exceeds the preset relative delay maximum value.

5. The terminal according to claim 4, wherein the processor, when executing the instructions, is further configured to, before adjusting the sound card delay value according to the relative delay value:
obtain an echo return loss enhancement generated by performing echo cancellation processing; and
determine that the relative delay value satisfies a preset stability condition and the echo return loss enhancement exceeds a preset enhancement threshold.

6. A terminal, comprising a memory storing instructions and a processor in communication with the memory, and when executing the instructions, the processor is configured to:
initialize a delay confirming flag value to be an initial flag value;
estimate a sound card delay value of a computer sound card;
initialize and accumulate a near-end audio buffer queue and a reference audio buffer queue until a difference obtained by subtracting a length of the near-end audio buffer queue from a length of the reference audio buffer queue is greater than or equal to an audio data length corresponding to the sound card delay value;
extract, in accordance with audio frames, audio data from the reference audio buffer queue and head of the near-end audio buffer queue for echo cancellation processing;
obtain a relative delay value generated by performing echo cancellation processing;
obtain an echo return loss enhancement generated by performing the echo cancellation processing;
determine whether the relative delay value satisfies a preset stability condition and whether the echo return loss enhancement exceeds a preset enhancement threshold;
adjust the sound card delay value according to the relative delay value and thereafter setting the delay confirming flag value from an initial flag value to a non-initial flag value; and
reset, if the relative delay value does not satisfy the preset stability condition or the echo return loss enhancement does not exceed the preset enhancement threshold, the delay confirming flag value to the initial flag value when it is detected that a state in which the relative delay value does not satisfy the preset stability condition lasts longer than a preset period of time or occurs more than a preset number of times.

7. One or more non-transitory computer readable storage media storing a computer executable instruction, when the computer executable instruction, when executed by one or more processors, cause one or more processors to:
initialize a delay confirming flag value to be an initial flag value;
estimate a sound card delay value of a computer sound card;
initialize and accumulate a near-end audio buffer queue and a reference audio buffer queue until a difference obtained by subtracting a length of the near-end audio buffer queue from a length of the reference audio buffer queue is greater than or equal to an audio data length corresponding to the sound card delay value;

extract, in accordance with audio frames, audio data from the reference audio buffer queue and head of the near-end audio buffer queue for echo cancellation processing;

obtain a relative delay value generated by performing echo cancellation processing;

obtain an echo return loss enhancement generated by performing the echo cancellation processing;

determine whether the relative delay value satisfies a preset stability condition and whether the echo return loss enhancement exceeds a preset enhancement threshold;

adjust the sound card delay value according to the relative delay value and thereafter setting the delay confirming flag value from an initial flag value to a non-initial flag value; and determine whether the relative delay value is less than a preset relative delay minimum value if the delay confirming flag value is not the initial flag value; if the relative delay value is less than the preset relative delay minimum value, remove, from the head of the reference audio buffer queue, an audio data length corresponding to a difference obtained by subtracting the relative delay value from the preset relative delay minimum value; or if the relative delay value is not less than the preset relative delay minimum value, add, to tail of the near-end audio buffer queue, an audio data length corresponding to a difference obtained by subtracting a preset relative delay maximum value from the relative delay value, when it is determined that the relative delay value exceeds the preset relative delay maximum value.

* * * * *